United States Patent
Heins

[15] 3,652,318
[45] Mar. 28, 1972

[54] PROCESS FOR THE PRODUCTION OF ANTIDAZZLE GLASS FILTERS

[72] Inventor: Herbert Heins, Hamburg-Rissen, Germany

[73] Assignee: J. D. Moller Optische Werke GmbH, Wedel, Holstein, Germany

[22] Filed: Nov. 13, 1969

[21] Appl. No.: 876,559

Related U.S. Application Data

[63] Continuation-in-part of Ser. No. 615,932, Feb. 14, 1967, abandoned.

[52] U.S. Cl. .................. 117/33.3, 117/106 R, 117/124 A, 117/DIG. 10
[51] Int. Cl. .................. B44d 5/06, C03c 17/00, C23c 11/00
[58] Field of Search .............. 117/106 R, 106 D, 33.3, 124 A, 117/DIG. 10

[56] References Cited

UNITED STATES PATENTS 3,271,179  9/1966  Smith, Jr. ........................ 117/33.3
3,034,924  5/1962  Kraus et al. .................... 117/33.3 X

*Primary Examiner*—Alfred L. Leavitt
*Assistant Examiner*—Kenneth P. Glynn
*Attorney*—McGlew and Toren

[57] ABSTRACT

Vacuum-coated antidazzle glass filters, such as sunglasses filters, are produced by adding elementary boron or a boron-releasing compound to silicon dioxide and evaporating the mixture onto glass under a vacuum. The minimum thickness of the coating formed by evaporation should be about 1.5 $\mu$. By adding a dyestuff to the mixture before evaporation, the degree of light absorption can be controlled.

19 Claims, No Drawings

PROCESS FOR THE PRODUCTION OF ANTIDAZZLE GLASS FILTERS

CROSS-REFERENCE TO PRIOR APPLICATION

This is a continuation-in-part of application Ser. No. 615,932, filed Feb. 14, 1967, now abandoned.

BACKGROUND INFORMATION AND PRIOR ART

It is conventional practice to manufacture sunglass filters by the processing of bath dyed glass melts, and also by evaporating a thin film of absorbent substances on to the lenses after manufacture. The evaporated film must be very hard and resistant to chemicals.

The substance used for evaporation in known processes is a mixture, one component of which is a weakly absorbent substance, for example quartz, while the highly absorbent and dye component is, for example, chromium. The amounts of the two substances used are such as to provide the required absorption in the sunglasses.

The resultant glasses have drawbacks because the thin evaporated films give colored reflections due to interference phenomena. These undesirable reflections vary in color with the evaporated charge. It has not been possible in practice to obtain perfect control of the reflection color while at the same time keeping the color of transmitted light constant. This makes it very difficult to pair and exchange lenses from different charges, although this is desirable and in some cases essential for antidazzle glass filters. The disturbing colors of these films are obviated by evaporating thicker films than are conventional with known methods. Thicker films render lenses interchangeable. Experience has shown that a minimum adequate film thickness for the indicated purpose is 1.5 $\mu$. The optical thickness obtained by multiplication with the refractive index is correspondingly greater.

To prevent excessive coloration of the glasses at these film thicknesses, the dye substances must be diluted with a substance having a sufficiently low absorption. The low-absorption substance is hereinafter referred to as the dilution substance.

Prior to this invention, no really suitable dilution substance having a low natural absorption was available; only the oxides come into consideration, because of their hardness. Although quartz is non-absorbent in its initial state, it is decomposed by reaction with the hot crucible material and is converted to an absorbent state. The invention hereinafter explained will be practiced principally by evaporation by means of resistance heating of the crucibles, as is conventional in modern plants without any expensive ancillary equipment.

Quartz or silicon dioxide as a dilution substance, either alone or in conjunction with boron oxide, has the following disadvantages: Evaporation from the liquid phase takes place only at a relatively high temperature. This results in a large consumption of expensive crucibles, because the crucibles are considerably corroded by the intimate contact with the hot liquid silicon dioxide. Another disadvantage is that the evaporation process has to be continued until the required absorption is obtained, as measured by a photometer. The evaporation process is then interrupted, irrespective of whether all the substance for evaporation has been consumed. The residues in the crucible can be removed only with great difficulty, and this also results in damage to the crucible material.

Freshly added substance for evaporation means that it is impossible to obtain reproducibly the same absorption value with the next charge, because the residue substances has already been very much decomposed.

SUMMARY OF THE INVENTION

It has now been found that high grade antidazzle glass filters can be produced, and the evaporation process can be performed without the above-mentioned difficulties and drawbacks if, according to the present invention, elementary boron or a boron compound which yields elementary boron on heating, is added to a silicon dioxide containing substance, and the mixture thus obtained is evaporated. Dye additives, particularly chromium oxide, may be added to the mixture to be evaporated. The latter acts then as a diluent in relation to the chromium oxide.

It has been found that the absorption is reduced, and not increased, by the addition of the highly absorbent elementary boron. The advantage of this low natural absorption of the new dilution substance is that the latter enables absorption values to be obtained which are controllable within wide limits. Without changing the composition of the dilution substance it is possible to obtain absorption values of 15 percent to 90 percent for film thicknesses of about 1.5 $\mu$. These film thicknesses make it possible to provide evaporated films which are free of any iridescent interference colors. The new substances sublimate from the solid phase and attack the crucibles only slightly. Non-evaporable residues can readily be removed from the crucible. The latter can therefore be filled with fresh substance before each new charge. This is an essential feature because it provides identical evaporation conditions for each charge. Exchangeable sunglasses may thus be produced which match exactly. The speed of evaporation is also increased by the boron.

Instead of elementary boron, the invention also encompasses the use of a substance which yields elementary boron on heating. Particularly suitable boron yielding substances for the inventive purposes are the metal borides and particularly metal borides whose metallic moiety, in elementary state, has a boiling point above 2,400° C. Such metal borides are, for example, the borides of cobalt, chromium, iron, hafnium, molybdenum, niobium, tantalum, thorium, titanium, uranium, vanadium, tungsten and zirconium.

The borides of the following metals lend themselves equally well for the inventive purposes, but their use is less economical due to their high costs: erbium, holmium, gadolinium, lutetium, neodymium, praseodymium, scandium, terbium and yttrium.

It has also been established that the borides of aluminum, beryllium, cerium, copper, germanium, lanthanum, nickel and palladium give excellent results.

As a general proposition, it may be stated that any metal boride may be used which, under the conditions of the inventive process releases elementary boron and whose metallic moiety either does not vaporize at all or to a negligible extent only. Accordingly, it is preferred to use metal borides which have a high boron but a low metal content. Thus, for example, in respect to aluminum boride the preferred choice would be $AlB_{12}$ an not $AlB_2$, although the latter compound would also yield acceptable results. Barium boride, $BaB_6$ is another example. Further, the following metal borides, having a high boron moiety, lend themselves for the inventive purposes:

Strontium boride ($SrB_6$),
Calcium boride ($CaB_6$) and
Manganese boride ($MnB_4$).

From a practical point of view, metal borides are preferred whose metallic moiety, in elementary state, has a specific gravity of above 9. Such borides of the following metals fulfill this requirement: Hafnium, molybdenum, tantalum and tungsten. Such metal borides cause particularly smooth evaporation without sputtering.

It should be emphasized, however, that the boron yielding or releasing substance need not be a metal boride. It has thus been ascertained that silicon borides, as for examples $SiB_4$, $SiB_6$ and $SiB_{12}$ yield equally advantageous results for the inventive purposes. The addition of silicon borides to silicon dioxide thus results in the formation of vaporizable boron oxide-silicon oxide compounds which form excellent coatings when vacuum deposited on lenses.

The effect of adding a boron releasing substance is the same as that of elementary boron proper. The crucible can then be heated more rapidly, however, without any danger of the mixture sputtering out, since the metallic borides yield boron gently and lie quietly in the crucibles because of their high specific gravity. This is particularly so if the specific gravity is above 9.

As compared to the prior art silicon monoxide films, coatings prepared according to the invention in the required thickness of at least about 1.5 $\mu$ have the advantage of reduced self-coloration and reduced yellow cast. This also holds true in comparison to prior art silicon monoxide films which were applied by the customary slow evaporation. The new films or coatings can be rapidly applied by evaporation without any disadvantages or detrimental effects. Their transparency is clear and they have no streaks as are otherwise frequently observed with thicker silicon monoxide films.

It is advantageous to apply a reflection-reducing film with the new antidazzle coatings, and the same applies to aftertreatment by annealing.

In comparison to known methods of producing absorption coatings free from colored reflections, by means of non-homogeneous films or films having the same refractive index as glass, the new films are produced without colored reflections on the basis of the known physical fact that white light does not have any visible interference colors given a high phase difference. Non-homogeneity or the same refractive index as glass is neither required nor present. The reproducible films according to the invention are applied by evaporation in a simpler process than is used for the non-homogeneous films and are of increased hardness, since hard oxides are used.

The evaporation process is advantageously performed in known equipment under a high vacuum and at a relatively low temperature of about 1,300° C. The crucibles are also heated in a manner known per se.

The crux of the invention essentially resides in the formation of a boron-silicon dioxide mixture in which the boron is supplied either directly or by means of a boron-releasing compound, such as a metal boride or silicon boride as explained. The boron acts chemically on the silicon dioxide. The resulting reaction product of boron and silicon dioxide is more readily evaporated than silicon dioxide and boron alone. A synergistic effect is thus achieved. It should thus be recognized that in accordance with the invention it is essential that the reacting substances of boron and silicon dioxide is formed before the evaporation proper. Due to the prior formation of the boron-silicon dioxide product - which thus has a lower evaporation temperature than the ingredients of the reaction product - the residual part of the boron releasing substance, be it metal or silicon, is of secondary importance as long as the boron releasing compound is capable of yielding its boron before the evaporation sets in. For this reason the danger that the entire boron releasing substance evaporates is minimized and the amount of elementary metal or silicon that is carried along by the vapors and deposited on the glasses is negligible. In most instances no metal or silicon whatsoever is carried along.

The invention will be described in more detail in the following Examples.

EXAMPLE 1

Five parts by weight of silicon dioxide were added to one part by weight of elementary boron and the vaporizable mixture thus obtained was heated under a high vacuum to a temperature of about 1,300° C. in a molybdenum crucible. The mixture was readily converted into the vapor phase and the vapor was deposited on manufactured and ground lenses in a high vacuum.

The degree of absorption was constantly measured by a photometer and evaporation was discontinued as soon as the required degree of absorption was obtained.

Residues were readily removed from the crucible after completion of the evaporation process. The crucible was undamaged and was re-used repeatedly. The thickness of the film applied on the lenses was 1.5 $\mu$. The lenses had a slightly yellowish color and were free of any colored reflections; they are suitable as protection for sensitive eyes.

EXAMPLE 2

A molybdenum crucible containing a dilution substance according to Example 1 and a preselected amount of chromium oxide was placed in a high vacuum evaporation container. The proportion of chromium oxide for a film having an absorption of 75 percent was 250 mg. 1 g. of dilution substance. For glasses of lower absorption, a correspondingly smaller quantity of chromium oxide was added, while the composition of the dilution substance was left unchanged.

The lenses, which were rotated above the crucible during the evaporation process, had a completely uniform transparency free from any streaks over their entire surface. The film applied by evaporation had a thickness of 1.5 $\mu$. It was free of disturbing interference phenomena and ready for use without any repolishing. The film is scratchproof in use. The coated lenses were subjected to known aftertreatment (annealing) at 400° C. for 1 hour and then had a pleasant greybrown transparent color. Residues were readily removed from the crucible.

EXAMPLE 3

The evaporation method according to Example 2 was performed in two separate crucibles, one of which contained the mixture and the other one the dye substance. The proportions of silicon dioxide and elementary boron in the mixture, as indicated in Example 1, were found to be very favorable. If these proportions are altered a greater quantity of unused residue remains in the crucible. The lenses provided with an evaporation-applied absorption film were then additionally coated with a thin film of quartz on the coating side in the same high vacuum chamber. This quartz film acts as a reflection-reducing film.

EXAMPLE 4

Instead of elementary boron, a metallic boride in the form of tungsten boride, was added to the silicon dioxide according to Examples 1 to 3 in increased amount to correspond to the higher molecular weight. Boron evolved on heating and the advantageous effect indicated in the above Examples was obtained to the same extent.

EXAMPLE 5A (TWO STEP PROCEDURE)

First step:

Five parts by weight of silicon dioxide were in a first step added to one part by weight of elementary boron. The mixture thus obtained was heated in a high vacuum to a temperature of about 1,300° C. in a molybdenum crucible. The mixture readily passed into the vapor phase and was deposited at the inner wall of a vessel in which the molybdenum crucible was placed or the surface of a carrier plate situated above the molybdenum crucible.

Second step

The sublimated substance was loosened from the carrier plate or the inner wall of the vessel and was heated in a molybdenum crucible in a second step for evaporation in a high vacuum. The substance readily passed into the vapor phase and was deposited on manufactured and ground lenses in high vacuum.

EXAMPLE 5B

Example 5A was repeated, but the elementary boron was replaced by a metal boride. The test was thus carried out with the borides of tungsten, nickel, molybdenum, hafnium and copper. The amount of the respective metal boride was chosen so that the ratio of silicon dioxide to metal boride, calculated on free boron, was 5:1. The results were equivalent to those of Example 5A.

EXAMPLE 5C

Example 5A was repeated, but the elementary boron was replaced by $SiB_6$. The amount of $SiB_6$ was chosen so that the ratio of silicon dioxide to $SiB_6$, calculated on free boron, was 5:1. The results were equivalent to those of Example 5A.

EXAMPLE 6

The procedures of Examples 1–3 were repeated. The elementary boron, however, in each case, was replaced by a metal boride. The following metal borides were thus tested:

a. Hafnium boride
b. molybdenum boride
c. niobium boride d. tantalum boride
e. zirconium boride
f. cobalt boride
g. thorium boride
h. vanadium boride
i. scandium boride
j. gadolinium boride
k. copper boride
l. palladium boride.

The amount of the respective boride was chosen so that the ratio of silicon dioxide to metal boride, calculated as free boron, was about 5:1. Accordingly, in calculating the specific amounts, the molecular weight of the metal boride had to be considered.

The metal borides *b–d* have a specific weight above 9 and are particularly recommended because of their low cost and the fact that the evaporation proceeds particularly smoothly and without sputtering. Tungsten boride mentioned in Example 4 belongs as well to these particularly recommended borides.

The beneficial effect obtained according to Examples 1–3 was also obtained with each of the tested metal borides.

EXAMPLE 7

In this Example the procedures of Examples 1–3 were repeated. The elementary boron was, however, replaced by a metal boride having a particularly high boron containing moiety. The Example was thus performed with aluminum boride ($AlB_{12}$) and
barium boride ($BaB_6$).

The amount of the respective boride was chosen so that the ratio of silicon dioxide to free boron was about 5:1. Boron evolved on heating and the same beneficial effects obtained according to Examples 1–3 were obtained in this Example.

EXAMPLE 8

This Example deals with the use of silicon borides instead of elementary boron. The following silicon borides were used
$SiB_4$
$SiB_6$ and
$SiB_{12}$.

5 parts by weight of silicon dioxide were added to one part by weight of the respective silicon boride. The mixture thus obtained was heated in a molybdenum crucible to a temperature of about 1,300° C. under high vacuum conditions. The mixture was readily converted into the vapor phase and the vapor formed was vacuum deposited on manufactured and ground glasses. Coatings of excellent quality having all the desired characteristics were obtained.

In the above Example, both the boron and the silicon act reactively on the silicon dioxide and vaporizable boron oxide-siliconoxide compounds are formed.

What is claimed is:

1. A process for the production of vacuum coated glass filters, which comprises preparing a mixture of elementary boron and silicon dioxide and evaporating the reaction product formed from said boron and said silicon dioxide onto glass under vacuum to form a coating on said glass.

2. A process as claimed in claim 1, wherein the ratio of elementary boron to silicon dioxide in the mixture is about 1:5.

3. A process as claimed in claim 1, wherein chromium oxide is added to the mixture.

4. A process for the production of vacuum coated glass filters, which comprises heating a mixture of silicon dioxide and an elementary boron releasing substance until said substance releases its boron and the evolved boron reacts with said silicon dioxide, and evaporating the boron-silicon dioxide reaction product onto glass under vacuum to form a coating on said glass.

5. A process as claimed in claim 4, wherein said substance is a silicon boride.

6. A process as claimed in claim 5, wherein said silicon boride is $SiB_4$, $SiB_6$ or $SiB_{12}$.

7. A process as claimed in claim 4, wherein said substance is a metal boride.

8. A process as claimed in claim 7, wherein the metal boride is the boride of a metal whose metallic moiety, in elementary state, has a boiling point above 2,400° C.

9. A process as claimed in claim 7, wherein said metal boride is a boride of aluminum, beryllium, erbium, holmium, cerium, cobalt, chromium, copper, iron, gadolinium, germanium, hafnium, lanthanum, lutetium, molybdenum, niobium, neodymium, nickel, palladium, tantalum, tungsten, thorium, titanium, uranium, vanadium, zirconium, praseodymium, scandium, terbium, yttrium, manganese, calcium, strontium, barium.

10. A process as claimed in claim 7, wherein the metal boride is the boride of a metal, whose metallic moiety, in elementary state, has a specific gravity of above 9.

11. A process as claimed in claim 7, wherein the metal boride is $AlB_{12}$, $CaB_6$, $SrB_6$, $BaB_6$ or $MnB_4$.

12. A process as claimed in claim 4, wherein the ratio of silicon dioxide to said substance, calculated on free boron, is about 5:1.

13. A process as claimed in claim 4, wherein chromium oxide is added to the mixture.

14. A process as claimed in claim 1, wherein said coating has a thickness of at least about 1.5 $\mu$.

15. A process as claimed in claim 3, wherein said coating has a thickness of at least about 1.5 $\mu$.

16. A multi-step process for the production of vacuum coated glass filters, which comprises preparing a mixture of elementary boron and silicon dioxide, evaporating the reaction product formed from said boron and said silicon dioxide, depositing the evaporated reaction product on a substrate by sublimation, removing the sublimated substance from the substrate and evaporating said sublimated substance under vacuum onto glass to form a coating on said glass.

17. A multi-step process for the production of vacuum coated glass filters, which comprises heating a mixture of silicon dioxide and an elementary boron releasing substance until said substance releases its boron and the evolved boron reacts with said silicon dioxide, evaporating the reaction product formed from said boron and said silicon dioxide, depositing the evaporated reaction product on a substrate by sublimation, removing the sublimated substance from the substrate and evaporating said sublimated substance under vacuum onto glass to form a coating on said glass.

18. A multi-step process as claimed in claim 17, wherein said boron releasing substance is a silicon boride or a metal boride.

19. A multi-step process as claimed in claim 18, wherein said silicon boride is $SiB_4$, $SiB_6$ or $SiB_{12}$ and said metal boride is the boride of aluminum, beryllium, erbium, holmium, cerium, cobalt, chromium, copper, iron, gadolinium, germanium, hafnium, lanthanum, lutetium, molybdenum, niobium, neodymium, nickel, palladium, tantalum, tungsten, thorium, titanium, uranium, vanadium, zirconium, praseodymium, scandium, terbium, yttrium, manganese, calcium, strontium, barium.

* * * * *